Aug. 17, 1948.   D. S. DENCE   2,447,058
MULTIPLE CLUTCH MECHANISM
Filed July 5, 1944   3 Sheets-Sheet 3
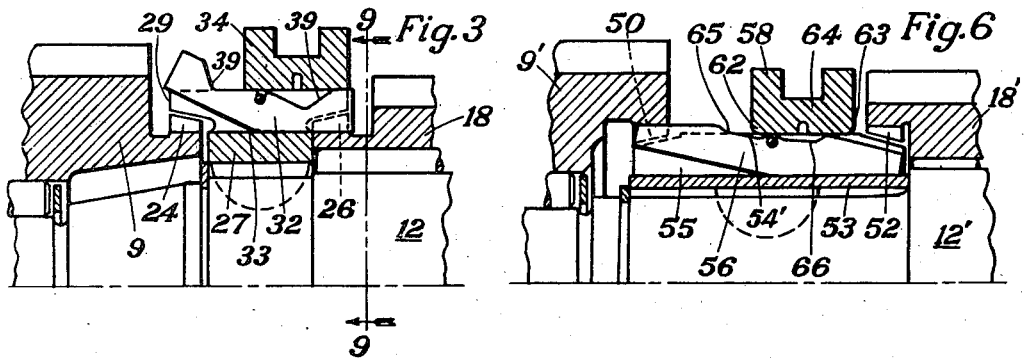
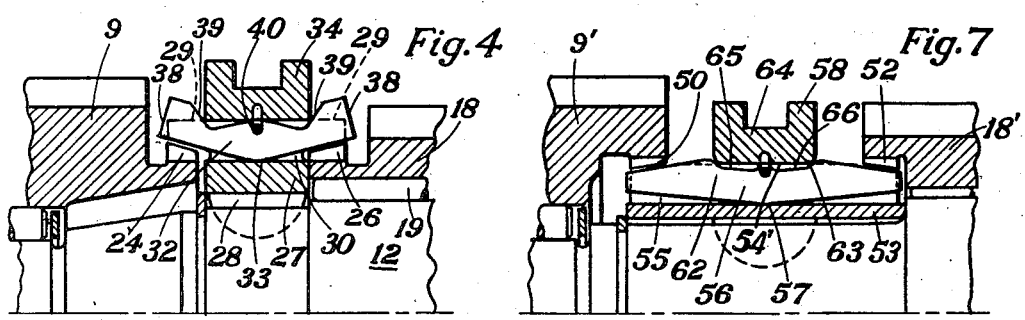
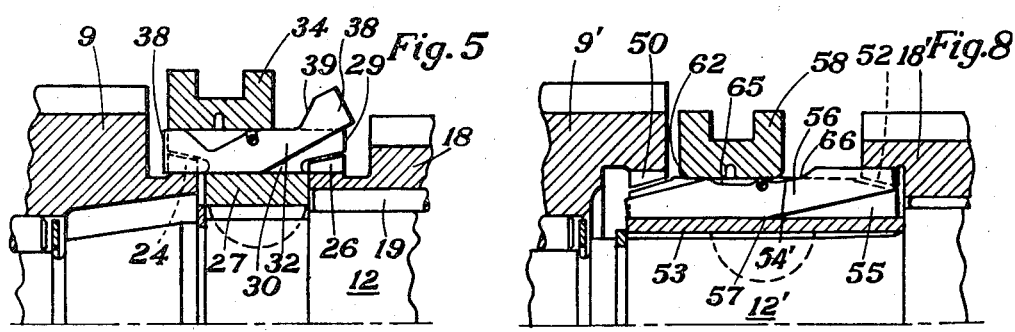
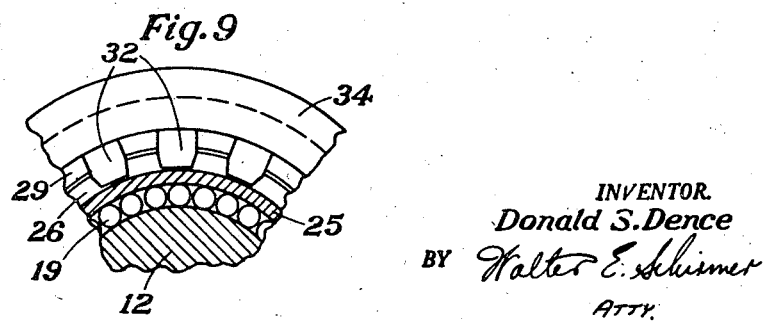
INVENTOR.
Donald S. Dence
BY Walter E. Schirmer
ATTY.

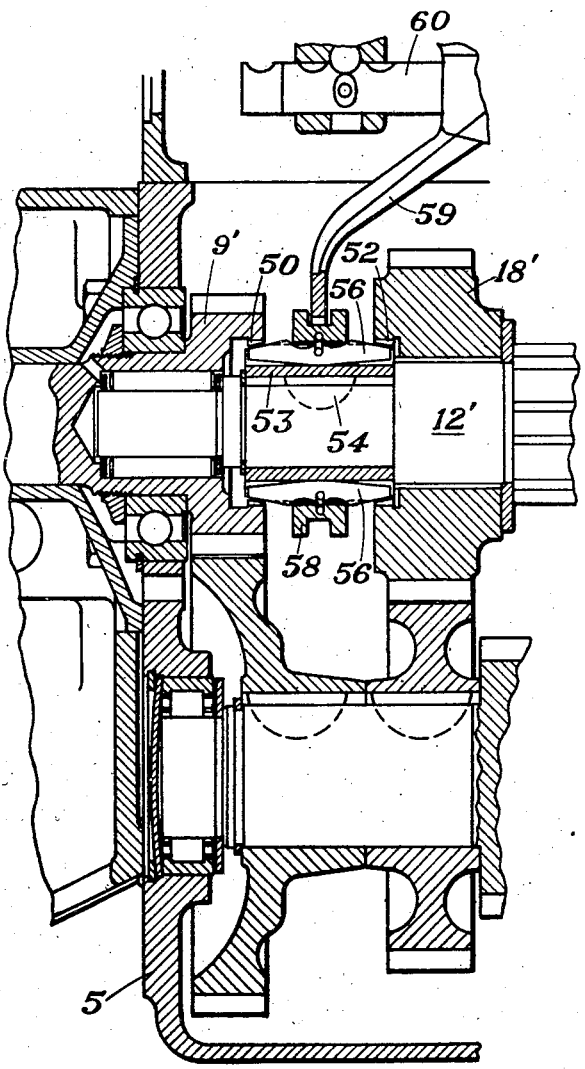

Patented Aug. 17, 1948

2,447,058

UNITED STATES PATENT OFFICE 2,447,058

MULTIPLE CLUTCH MECHANISM

Donald S. Dence, Berrien Springs, Mich., assignor to Clark Equipment Company, Buchanan, Mich., a corporation of Michigan Application July 5, 1944, Serial No. 543,512

9 Claims. (Cl. 192—48)

This invention relates to transmissions, and more particularly is directed to a clutch mechanism provided between adjacent gears in the transmission for selectively clutching either of the gears to the transmission output shaft.

Heretofore, in transmissions this clutching operation has been accomplished by a sliding clutch sleeve or the like having gear teeth at opposite ends thereof so that upon axial shifting of the sleeve in opposite directions the teeth are selectively engaged with corresponding clutch teeth carried on the adjacent gears to couple the sleeve and the gear for conjoint rotation. The sleeve itself has been mounted in splined engagement with the shaft.

With such previous constructions it is apparent that an axial space on the shaft must be provided sufficient to accommodate shifting movement into clutching engagement in one direction, thence out of clutching engagement in neutral position and into clutching engagement in the opposite direction. This requires elongation of the transmission, especially in the types having four or more speeds where a plurality of such clutch members are required for the various speed ranges.

In order to overcome this objection and still provide an adequate clutching element I have designed a selective clutch member for transmissions of this type which is fixed on the shaft against axial movement and which comprises a carrier member having circumferentially spaced rocker arms adapted to be rocked radially at opposite ends by means of a shift yoke for selective rocking engagement into coupling engagement with adjacent clutch teeth on the gears rotatively journaled on the shaft.

This rocking action eliminates the axial shift movement heretofore required, and materially reduces the spacing required between the gears, since there is no axial sliding movement of the coupling members but only a radial rocking action.

While the invention has been disclosed as incorporating clutching teeth on the gears and tooth-like rocker members, it is to be understood that this is by way of illustration only, and that the mechanism can embody any complementary locking surfaces such as cam surfaces or serrated interlocking surfaces, since when the rocker members are moved into engaged position they are held against radial displacement by an encircling sleeve which positively locks the rocker members in coupled position with the gear and prevents any possibility of the transmission declutching or walking out of clutching position, which has been a common defect in previous types of clutch members.

Therefore, another object of the invention is to provide a clutch member of this type which will positively prevent unauthorized declutching which has been a prevalent occurrence, especially during such times as the direction of torque is reversed in the transmission, for example, when the vehicle is coasting.

Other objects and advantages of the present invention such as the simplicity of design and relative few number of parts required will be more apparent from the following detailed description which, taken in conjunction with the accompanying drawings, will disclose to those skilled in the art the particular construction and operation of a preferred form of the present invention.

In the drawings:

Figure 2 is a corresponding view showing a modified form of the invention;

Figure 1:
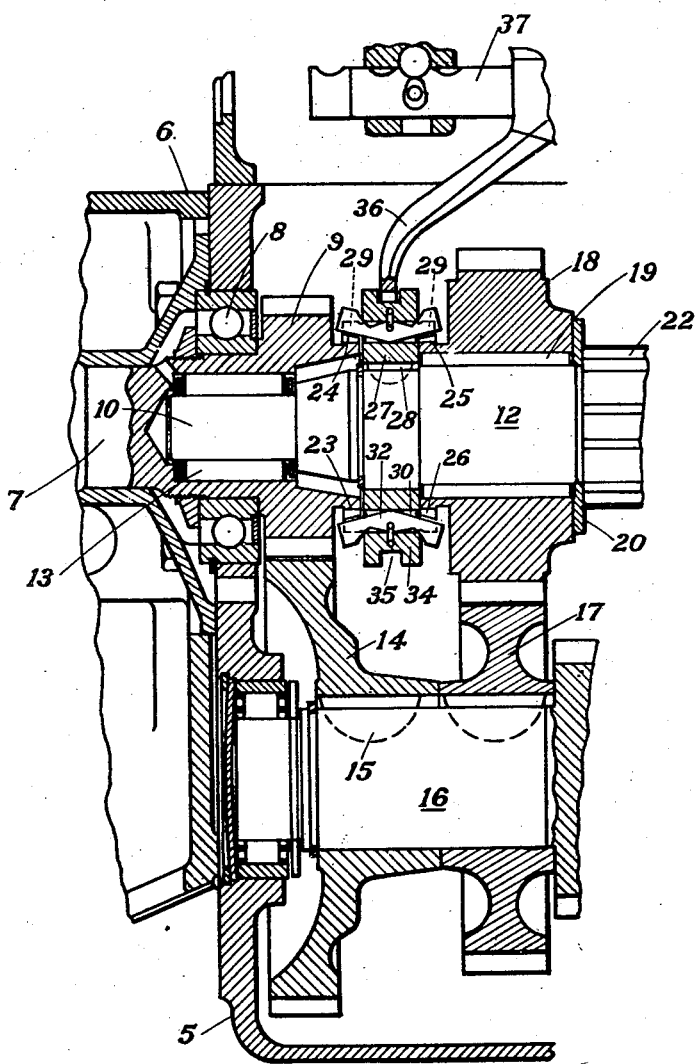
Figure 1 is a sectional view through a transmission embodying one form of the present invention.

Figures 3 to 5, inclusive, are detail sectional views illustrating the action of the clutching mechanism shown in Figure 1;

Figures 6 to 8, inclusive, are detail sectional views of the clutch member shown in Figure 2; and Figure 9 is a sectional view taken substantially on line 9—9 of Figure 3.

Referring now in detail to the construction shown in Figures 1, 3, 4 and 5, a transmission housing is indicated generally at 5 and is secured to the clutch housing 6 which carries the drive shaft 7 extending through the end wall of the transmission and is suitably supported therein by the bearing 8.

The shaft 7 is provided within the transmission 5 with an enlarged drive gear portion 9 and is recessed to receive the reduced end 10 of the output shaft 12 of the transmission which is journaled within the gear 9 by means of the roller bearings 13.

The drive gear 9 is in constant meshing engagement with a gear 14 keyed as at 15 to the countershaft 16 of the transmission. A second gear 17 is keyed on the countershaft 16 and in turn drives the gear 18 journaled as by means of the needle rollers 19 upon the shaft 12 and held at one end against axial movement by the washer 20 which is abutted up against the splined portion 22 of shaft 12.

The gear 9 is provided with a reduced hub portion 23 having clutch teeth 24 formed thereon, the teeth 24 being tapered in an axial direction toward the main gear portion 9.

Similarly, the gear 18 is provided with a hub portion 25 having corresponding axial tapered teeth 26 whereby it will be noted that each of the gears is provided with external clutch teeth spaced on opposite sides of the member 27.

This member 27 comprises an annular hub portion which is keyed or otherwise secured as at 28 to a reduced portion of the shaft 12, and beyond the teeth 24 and 26 is axially extended as indicated at 29 to overlie the teeth in a radial direction.

The member 27 has axially bored slots 30 formed at circumferentially spaced points therein, there being a plurality of such slots formed around the annular surface of the member. Disposed within each of these slots is a rocker member 32, the member 32 being supported against circumferential displacement by means of the shoulder portions 29 forming extensions of the slots 30 and being provided with rocking contact as indicated at 33 whereby the members 32 can rock radially in either direction and into and out of engagement with the teeth 24 and 26, respectively.

Mounted in splined engagement for axial sliding movement on the annular surface of the member 27 and extending around the slots 30 is a yoke member 34 having a reduced annular groove 35 receiving the shifter yoke 36 carried by the shift rail 37. The clutch is shown in neutral position in Figures 1 and 4 with both ends of the rocker members 38 in raised position with the member being held against rocking movement by the abutment of the cam surfaces 39 against the inner annular edges of the shifter member 34. In this position the engaging portions of the members 32 are out of engagement with the teeth 24 and 26, and neither of the gears 9 or 18 is clutched to the shaft 12. When the shifter rail 37 is actuated to move the sleeve 34 to the right as viewed in Figure 3, the rocker member 32 rocks about its fulcrum 33, the right-hand end being moved downwardly into engagement with the clutch teeth 26 of gear 18, while the left-hand end moves upwardly due to the camming action of the member 34 against the right-hand surface 39. In this position the gear 18 is clutched to the member 27 for conjoint rotation with the shaft 12 and the rocker members 32 are held against moving out of clutching engagement by the encircling band action of the member 34 locked in position and held against movement by the detent on the shift rail. Since the disengaging movement is radial the hub strength of the member 34 holds the rocker members firmly in position, thereby insuring that there can be no unauthorized declutching nor can the transmission jump out of gear as is possible with other types of transmission clutches.

When the shift rail 37 is moved to the left from the position shown in Figure 3 it passes through the neutral position moving the rocker member into the position shown in Figure 4, and upon further shifting of the member 34 to the left the inner annular edge of the member 34 engages the left-hand cam surface 39, rocking the members 32 in a counterclockwise direction as shown in Figure 5 to engage the left-hand ends of the rocker members with the teeth 24 of the gear 9, thereby locking the gear 9 to the member 27 for conjoint rotation with the shaft 12. It will be noted that the rocker members are provided with recesses 40 within which is disposed an annular spring also passing through an annular groove in the carrier member 27 whereby the rocker members are held against axial shifting movement within the slots 30, insuring positive retention of these members in the proper position.

It will therefore be apparent that with this construction there is no axial shifting of gear teeth into and out of engagement requiring elongation of the transmission to accommodate such axial shifting, nor is there any possibility of the clutch becoming accidentally disengaged once it has been moved into engagement with either of the gears. The cam action of the member 34 against the cam surfaces 39 of the rocker members 32 can be controlled so as to force these members radially into engagement with the teeth 24 or 26 through feel of the operator on the gear shift lever, and is no different than the necessary operations now required in the conventional types of transmissions using dental clutches.

In the form of the invention shown in Figures 2, 6, 7 and 8, I have provided a modified form of the invention embodying the same principles but adapted for use when the gears in the transmission are provided with internal clutch teeth rather than external clutch teeth. Similar portions of the construction are identified by corresponding reference numerals. In the form shown in these figures the gear 9' is provided with an overhanging portion having internal clutch teeth 50 which are axially tapered as described in connection with the clutch teeth 24. Similarly, the gear 18' is provided with axially tapered internal clutch teeth 52. Disposed intermediate the teeth 50 and 52 about the shaft 12' is an annular hub member 53 keyed as at 54 to the shaft 12' and provided with axially extending slots milled in the periphery thereof at circumferentially spaced points, the slots being indicated at 55. Disposed in the slots 55 are rocker members 56 having oppositely tapered inner surfaces terminating at their center in a fulcrum point 57. The members 56 are axially extended into position to extend within the teeth 50 and 52 and are provided at their ends with corresponding surfaces for engagement with such teeth. It will be noted that the defining walls of the slots 55 provide an adequate backing surface preventing any displacement or skewing of the rocker members relative to hub 53. Mounted in splined engagement on the annular surface of the hub 53 about the slots 55 and the intermediate surfaces of the member between the slots is the axially shiftable collar 58 adapted to receive a shift yoke such as the shift yoke 59 carried by the shift rail 60. When the shift rail is in the position shown in Figure 2 the collar member 58 is in neutral position as shown in detail in Figure 7, the collar member having the internal edge surfaces 62 and 63 at opposite sides thereof which ride upon the surface 54' of the hub member 53 and are also engageable with the respective cam surfaces 65 and 66 of the rocker members 56. When the shift rail is moved to the right as viewed in Figures 2 and 6 the collar member 58 is correspondingly shifted axially over the surface 66 of the rocker member 56 and the edge surface 63 rides along the cam surface 65 of the rocker member, rocking the right-hand end of the rocker members 56 downwardly out of engagement with teeth 52 and into the bottom of the slots 55. The opposite or left-hand end of the rocker 56 moves radially outwardly into clutching engagement of the gear teeth 50 of the gear 9', thereby locking the gear and hub member 53 for conjoint rotation with shaft 12'. The detents on the shift rail prevent the collar 58 from moving into position which might cause disengagement of the rocker member with the teeth 50, thus preventing the transmission from jumping out of gear during coasting or the like.

As the shift rail is moved into the opposite direction the edge surface 62 of the collar 58 rides along the cam surface 65 of the rocker member, forcing the member downwardly at the left-hand end as the edge 63 moves over the hump on the surface 66. Further shifting movement of the collar 58 to the left causes the left-hand end of the rocker member to be cammed downwardly into the bottom of the slots 55, and the right-hand end is correspondingly moved upwardly into engagement with the internal teeth 52 of the gear 18'. This results in clutching the gear 18' rigidly to the shaft 12', and the edge collar 58 moving over the ends of the rockers locks the mechanism against any possible jumping out of gear. Due to the relatively long length of the rocker members 56 which are disposed in the slots 55 it is apparent that sufficient holding action is provided to prevent any warping or distortion of these rocker members when in engaged position caused by the torque imposed through the coupling. Of course, in the form of the invention shown in Figures 1 and 3 to 5, when in engaged position the rocker member is backed up directly by the ends 29 of the member 27 which form a sufficient support to prevent distortion of the member.

While as shown in Figure 9, the rocker members 32 as well as the rocker members 56 may be formed with gear tooth surfaces for engagement with corresponding clutch teeth on the adjacent transmission gears, it is to be understood that this is representative only since other surfaces than true gear engaging surfaces could be provided, and the action would be the same inasmuch as the encircling of the rocker members by the collar members 34 or 58 positively insures coupling action against radial displacement so that these surfaces might be in the form of triangular engaging surfaces or smooth curve surfaces of cog wheel style or any other type of interengaging complementary radially operable surfaces.

It is therefore believed apparent that I have provided a novel type of construction for a transmission clutch which occupies less axial space than is required by the axially shiftable type of dental clutch, and which has the further advantage of being positively locked in engaged position regardless of the direction of torque through the transmission.

While the invention has been shown in only two of its many possible forms, I do not intend to be limited to the exact construction herein disclosed, but only insofar as defined by the scope and spirit of the appended claims.

I claim:

1. Transmission clutch means for selectively clutching axially spaced gears to a shaft upon which said gears are journalled, comprising a hub member keyed to said shaft intermediate said gears, a collar axially shiftable on said hub member, axial slots in the periphery of said hub member, rocker members in said slots having end clutching portions, corresponding clutching portions on the adjacent ends of said gears, means coacting between said collar and rocker members whereby upon axial shifting of said collar said rocker members are simultaneously rocked radially to a position interengaging said clutching portions between one of said gears and said rocker members, said slots on said hub member extending axially into the radial plane of said clutching portions to provide circumferential support for the engaging ends of said rocker members.

2. The clutch means of claim 1 wherein said collar member in shifted position locks said rocker members against radial disengagement of said clutching portions.

3. Transmission clutch means disposed between two axially spaced gears rotatable relative to a coaxial shaft, comprising a hub keyed on said shaft, a collar axially shiftable on said hub, each of said gears having clutch tooth portions adjacent said hub, rocker members disposed axially in the periphery of said hub and having the ends thereof in radial alinement with said clutch portions of said gears, cam surfaces on said rocker members adapted to be engaged by said collar when shifted axially in either direction from an intermediate position on said hub for radially moving corresponding ends of said rocker members simultaneously into engagement with the corresponding clutch portions of one of said gears, said hub having means forming circumferential abutments for said ends of said rockers when in engaged position.

4. In combination, a shaft, a pair of axially spaced gears rotatable on said shaft, a hub member keyed on said shaft intermediate said gears, each of said gears having an annular internal clutch tooth portion adjacent said hub member, a series of circumferentially spaced axially extending slots in the periphery of said hub member, rocker members carried in said slots for substantially the full length thereof, and having clutch portions disposed in radial alinement with the clutch portions of said gears, cam surfaces on said rocker members, and a continuous collar mounted for selective axial shifting movement on said hub member to engage said cam surfaces for simultaneosuly rocking said members radially outwardly into clutching engagement with the clutch tooth portions of one of said gears.

5. In combination, a shaft, a pair of axially spaced gears rotatable on said shaft, a hub member keyed on said shaft intermediate said gears, each of said gears having an annular clutch portion adjacent said hub member, a series of circumferentially spaced axially extending slots in the periphery of said hub member, rocker members carried in said slots for substantially the full length thereof, and having clutch portions disposed in radial alinement with the clutch portions of said gears, cam surfaces on said rocker members, and a continuous collar mounted for selective axial shifting movement on said hub member to engage said cam surfaces for simultaneously rocking said members radially outwardly into clutching engagement with the clutch portions of one of said gears, said collar having an intermediate neutral position on said hub member and being shiftable in one direction toward one of said gears to rock the opposite ends of said rocker members radially outwardly into clutching engagement with the clutch portion of the opposite gear.

6. Transmission clutch means comprising a hub member mounted for conjoint rotation with a transmission shaft, a series of axial slots in the periphery of said member, axially extending rocker members disposed in said slots and supported laterally therein for substantially their full length, said members being fulcrummed intermediate their ends in the bottom of said slots, and a shifter collar mounted about the periphery of said hub member for axially shifting movement thereon, said rocker members having cam surfaces extending radially into the path of said collar, whereby axial movement of said collar in either direction from a neutral intermediate position rocks corresponding ends of said members radially into a position partially projecting from said slots but retained against transverse movement thereby for the full length thereof.

7. The clutch means of claim 6 including means for preventing axial shifting of said rocker members in said slots.

8. Transmission clutch means between adjacent clutch portions of transmission gears rotatably mounted on a transmission shaft, comprising a hub member keyed on said shaft and radially overlying said clutch portions, axially extending rocker members confined in the periphery of said hub member, a collar axially shiftable on said hub member for rocking said rocker members radially at one end into coupling engagement with the clutch portion of the adjacent gear.

9. The clutch means of claim 8 wherein said collar when in shifted position overlies said ends of said rocker members to prevent radial disengaging movement thereof.

DONALD S. DENCE.

REFERENCES CITED

The following references are of record in the file of this patent:

UNITED STATES PATENTS

| Number | Name | Date |
| --- | --- | --- |
| 1,517,189 | Brownback | Nov. 25, 1924 |
| 1,546,672 | Peacock | July 21, 1925 |
| 1,771,454 | Ward | July 29, 1930 |
| 1,930,711 | Fishburn | Oct. 17, 1933 |
| 2,001,120 | Brose | May 14, 1935 |
| 2,086,809 | Kreis | July 13, 1937 |
| 2,361,190 | Gerst | Oct. 24, 1944 |